United States Patent
Ito et al.

(10) Patent No.: US 12,319,621 B2
(45) Date of Patent: Jun. 3, 2025

(54) ZIRCONIA SINTERED BODY AND METHOD FOR PRODUCING SAME

(71) Applicant: TOSOH CORPORATION, Yamaguchi (JP)

(72) Inventors: Takeshi Ito, Kanagawa (JP); Shoichi Yamauchi, Kanagawa (JP); Isao Yamashita, Kanagawa (JP)

(73) Assignee: TOSOH CORPORATION, Yamaguchi (JP)

( * ) Notice: Subject to any disclaimer, the term of this patent is extended or adjusted under 35 U.S.C. 154(b) by 841 days.

(21) Appl. No.: 17/442,233

(22) PCT Filed: Mar. 24, 2020

(86) PCT No.: PCT/JP2020/012978
§ 371 (c)(1),
(2) Date: Sep. 23, 2021

(87) PCT Pub. No.: WO2020/196505
PCT Pub. Date: Oct. 1, 2020

(65) Prior Publication Data
US 2022/0162127 A1    May 26, 2022

(30) Foreign Application Priority Data

Mar. 26, 2019  (JP) .................................. 2019-058458
Feb. 18, 2020  (JP) .................................. 2020-025331

(51) Int. Cl.
C04B 35/486  (2006.01)
C04B 35/645  (2006.01)

(52) U.S. Cl.
CPC ........ C04B 35/486 (2013.01); C04B 35/6455 (2013.01); C04B 2235/3206 (2013.01);
(Continued)

(58) Field of Classification Search
CPC .............. C04B 35/486; C04B 35/6455; C04B 2235/3206; C04B 2235/3208; C04B 2235/3225; C04B 2235/9653
See application file for complete search history.

(56) References Cited

U.S. PATENT DOCUMENTS 11,807,579 B2 *  11/2023  Ito ....................... C04B 35/6455
2016/0016853 A1   1/2016  Yamada et al.

FOREIGN PATENT DOCUMENTS

CN   102803180 A   11/2012
EP   3 345 883 A1   7/2018
(Continued)

OTHER PUBLICATIONS

JP2013014471A machine translation (Year: 2013).*
(Continued)

*Primary Examiner* — Bryan D. Ripa
*Assistant Examiner* — Cameron K Miller
(74) *Attorney, Agent, or Firm* — GREENBLUM & BERNSTEIN P.L.C.

(57) ABSTRACT

Provided is at least one of a zirconia sintered body and a method for producing the same. The zirconia sintered body can be used in a wide range of applications compared with ceramic joined bodies of the related art that include transparent zirconia. A zirconia sintered body includes a transparent zirconia portion and an opaque zirconia portion, wherein the zirconia sintered body has a biaxial flexural strength of greater than or equal to 300 MPa.

15 Claims, 1 Drawing Sheet

(52) U.S. Cl.
CPC .......... *C04B 2235/3208* (2013.01); *C04B 2235/3225* (2013.01); *C04B 2235/9653* (2013.01)

(56) References Cited

FOREIGN PATENT DOCUMENTS

| | | | |
|---|---|---|---|
| JP | 2013-14471 A | | 1/2013 |
| JP | 2013-14472 A | | 1/2013 |
| JP | 2013014471 A | * | 1/2013 |
| JP | 2013-252978 A | | 12/2013 |
| JP | 2017-114758 A | | 6/2017 |
| JP | 2018-002495 A | | 1/2018 |
| JP | 2018-002528 A | | 1/2018 |
| JP | 2018-38551 A | | 3/2018 |
| JP | 2018-165243 A | | 10/2018 |
| KR | 101601948 B1 | | 3/2016 |
| WO | 2010/140644 A1 | | 12/2010 |

OTHER PUBLICATIONS

Tosoh-Zirconia-Brochure—Accessed Aug. 9, 2024—https://www.rbhltd.com/wp-content/uploads/2019/05/Tosoh-Zirconia-Brochure.pdf (Year: 2024).*

Martínez-Lebrusant, Charo, and Flora Barba. "Chemical analysis of impurities in zirconia and aluminium nitride ceramics by inductively coupled plasma atomic emission spectrometry." Analyst 115.10 (1990): 1335-1338. (Year: 1990).*

Extended European Search Report issued in European Patent Application No. 20776783.1 dated Nov. 22, 2022.

International Search Report issued in International Patent Application No. PCT/JP2020/012978, dated Jun. 16, 2020, along with an English translation thereof.

International Preliminary Report on Patentability issued in International Patent Application No. PCT/JP2020/012978, dated Sep. 28, 2021, along with an English translation thereof.

* cited by examiner

ZIRCONIA SINTERED BODY AND METHOD FOR PRODUCING SAME

TECHNICAL FIELD

The present disclosure relates to a zirconia sintered body and a method for producing the same.

BACKGROUND ART

Ceramics have excellent heat resistance, wear resistance and corrosion resistance and are therefore widely used in industrial component applications. In particular, the use of transparent ceramics has been expanding because of their high level of aesthetic property and high-quality feel. For example, regarding the use of transparent ceramics, studies are being conducted for applications in components of electronic device, such as cell phones, components of timepieces, jewelry and the like. Thus, as the use expands, a need arises for a component having not only a higher degree of aesthetic property but also a higher degree of design property; specifically, a need arises for a ceramic component made of a transparent ceramic and a ceramic having a different color.

Ceramics are materials with high toughness and are, therefore, difficult to process into a complex shape. Accordingly, in the related art, ceramic components having a complex shape have been produced by joining ceramics together.

For example, there is a report of a ceramic joined body formed of a colored zirconia sintered body and a transparent zirconia sintered body, which are joined to each other such that the colored zirconia sintered body is shrunk and the transparent zirconia sintered body is physically secured thereto (PTL 1).

CITATION LIST

Patent Literature

PTL 1: Japanese Unexamined Patent Application Publication No. 2013-14471

SUMMARY OF INVENTION

Technical Problem

The ceramic joined body described in PTL 1 is a joined body that was produced by utilizing the difference in thermal shrinkage associated with heat treatment and in which the sintered bodies were joined to each other via physical force. The joined body had low strength and, therefore, had limited applications.

An object of the present disclosure is to provide at least one of a zirconia sintered body and a method for producing the same. The zirconia sintered body can be used in a wide range of applications compared with ceramic joined bodies of the related art that include transparent zirconia.

Solution to Problem

In view of the problem described above, the present researchers performed studies. As a result, the present researchers discovered that a specific zirconia sintered body can solve the problem described above.

Specifically, a summary of the present disclosure is as follows.

[1] A zirconia sintered body comprising a transparent zirconia portion and an opaque zirconia portion, characterized in that the zirconia sintered body has a biaxial flexural strength of greater than or equal to 300 MPa.

[2] The zirconia sintered body according to [1], wherein the transparent zirconia portion and the opaque zirconia portion are disposed in the same plane.

[3] The zirconia sintered body according to [1] or [2], wherein the transparent zirconia portion has an in-line transmittance of greater than or equal to 50%.

[4] The zirconia sintered body according to any one of [1] to [3], wherein the opaque zirconia portion has an in-line transmittance of less than 5%.

[5] The zirconia sintered body according to any one of [1] to [4], wherein the transparent zirconia portion and the opaque zirconia portion include zirconia with the zirconia containing a stabilizing agent and titania.

[6] The zirconia sintered body according to [5], wherein the stabilizing agent is at least one selected from the group consisting of yttria, calcia and magnesia.

[7] The zirconia sintered body according to [5] or [6], wherein, in the transparent zirconia portion, the stabilizing agent is yttria, and a content of the yttria is 6 mol % or greater and 12 mol % or less.

[8] The zirconia sintered body according to any one of [5] to [7], wherein, in the opaque zirconia portion, the stabilizing agent is yttria, and a content of the yttria is 2 mol % or greater and less than 6 mol %.

[9] The zirconia sintered body according to any one of [5] to [8], wherein a content of the titania in the opaque zirconia portion is less than a content of the titania in the transparent zirconia portion.

[10] The zirconia sintered body according to any one of [1] to [9], wherein the opaque zirconia portion includes a coloring element.

[11] The zirconia sintered body according to [10], wherein the coloring element is at least one selected from the group consisting of transition metal elements, alkali metal elements, alkaline earth metal elements, aluminum, silicon, boron, phosphorus, germanium and rare earth metals.

[12] The zirconia sintered body according to any one of [1] to [11], characterized in that the zirconia sintered body has a biaxial flexural strength of greater than or equal to 350 MPa.

[13] A method for producing the zirconia sintered body according to any one of [1] to [12], characterized in that the method comprises a sintering step that includes sintering a secondary green body in which a primary green body and a green body are layered, the primary green body being made from one of a raw material powder for the transparent zirconia portion or a raw material powder for the opaque zirconia portion, the green body being made from the other of the raw material powders.

[14] The method for producing the zirconia sintered body according to [13], wherein the raw material powder for the transparent zirconia portion and the raw material powder for the opaque zirconia portion are each a mixed powder that includes a stabilizing-agent-containing zirconia source and a titania source.

[15] The method for producing the zirconia sintered body according to [13] or [14], wherein the sintering includes at least a HIP treatment.

[16] The method for production according to any one of [13] to [15], wherein the sintering includes performing pressureless sintering at 1300° C. or greater and 1400° C. or less and subsequently performing a HIP treatment at 1450° C. or greater and 1550° C. or less.

Advantageous Effects of Invention

With a sintered body of the present disclosure, it is possible to provide at least one of a zirconia sintered body and a method for producing the same. The zirconia sintered body can be used in a wide range of applications compared with ceramic joined bodies of the related art that include transparent zirconia.

DESCRIPTION OF EMBODIMENTS

A zirconia sintered body of the present disclosure will now be described with reference to exemplary embodiments.

The present embodiment is a zirconia sintered body comprising a transparent zirconia portion and an opaque zirconia portion. The zirconia sintered body has a biaxial flexural strength of greater than or equal to 300 MPa.

The zirconia sintered body of the present embodiment comprises a transparent zirconia portion and an opaque zirconia portion. Accordingly, it is likely that high levels of aesthetic property and design property are achieved. In another embodiment, the zirconia sintered body of the present embodiment is a multi-color zirconia sintered body, that is, a zirconia sintered body including two or more zirconia sintered bodies of different colors. In still another embodiment, the zirconia sintered body of the present embodiment is a sintered body including a zirconia sintered body that transmits light and a zirconia sintered body that does not transmit light and, further, is a zirconia sintered body formed of a zirconia sintered body that can be visually perceived as transparent and a zirconia sintered body that can be visually perceived as opaque.

Yet another embodiment is a zirconia sintered body formed of a zirconia sintered body made from zirconia having a cubic fluorite structure and a zirconia sintered body made from zirconia having a tetragonal fluorite structure.

It is preferable that the zirconia sintered body of the present embodiment have a structure in which the transparent zirconia portion and the opaque zirconia portion are sintered to each other. It is more preferable that the zirconia sintered body have a structure in which the transparent zirconia portion and the opaque zirconia portion are sintered to each other with an interface formed therebetween. It is even more preferable that gaps not be present at the interface. Note that "gaps not be present" refers to a state in which the interface is formed between the transparent zirconia portion and the opaque zirconia portion to such an extent that a strength of the zirconia sintered body of the present embodiment can be exhibited. That is, in the zirconia sintered body of the present embodiment, minor defects may be present to such an extent that the strength is not affected. Since the transparent zirconia portion and the opaque zirconia portion in this structure are joined to each other with no third component, such as a binding agent, being present therebetween, the zirconia sintered body of the present embodiment is a sintered body formed of a single-piece sintered structure and, therefore, having a reduced number of fracture initiation sites. Furthermore, with the structure in which the transparent zirconia portion and the opaque zirconia portion are sintered to each other with an interface formed therebetween, it is likely that mechanical strength increases. In addition, with the structure in which the transparent zirconia portion and the opaque zirconia portion are joined to each other with no third component being present therebetween, the zirconia sintered body of the present embodiment includes a particle structure having a crystalline particle structure in which crystalline particles of the transparent zirconia portion and crystalline particles of the opaque zirconia portion are sintered to one another. Accordingly, the zirconia sintered body of the present embodiment is different from a zirconia sintered body that does not have the particle structure or a zirconia joined body formed of two or more zirconia sintered bodies merely fitted to each other. That is, the zirconia sintered body of the present embodiment is a joined body in which the transparent zirconia portion and the opaque zirconia portion are joined to each other as a result of sintering and is, therefore, different from a joined body in which a transparent zirconia portion and an opaque zirconia portion are joined to each other only via physical force.

In general, transparent zirconia sintered bodies have lower strength than opaque zirconia sintered bodies. In contrast, because of the structure in which the transparent zirconia portion and the opaque zirconia portion are sintered to each other, the zirconia sintered body of the present embodiment tends to have increased strength of the transparent zirconia portion itself, compared with instances in which a transparent zirconia sintered body is present alone.

A shape of the zirconia sintered body of the present embodiment is not particularly limited. It is preferable that, at the least, the transparent zirconia portion and the opaque zirconia portion be disposed in the same plane. In the present embodiment, "in the same plane" means "in the same flat plane" or "in the same curved plane". It is more preferable that the transparent zirconia portion and the opaque zirconia portion be disposed in the same plane with the plane being visually perceivable. The structure in which the transparent zirconia portion and the opaque zirconia portion are disposed in the same plane facilitates the achievement of a high level of design property.

The shape of the zirconia sintered body of the present embodiment may be any shape, and examples thereof include shapes, such as spherical, generally spherical, disc-shaped, cylindrical, elliptically cylindrical, plate-shaped, cubic, rectangular parallelepiped, polyhedral and generally polyhedral, and shapes that conform to the intended use. In addition, the shape may be a shape that includes a structure having an arrangement in which one of the transparent zirconia portion or the opaque zirconia portion surrounds the other. Examples of this shape are illustrated in FIG. 1 of PTL 1. It is preferable that the shape be a shape having a structure in which the opaque zirconia portion surrounds the transparent zirconia portion.

Furthermore, the zirconia sintered body of the present embodiment can also be obtained by sintering a green body or the like in which a precursor of the transparent zirconia portion and a precursor of the opaque zirconia portion are in contact with each other without a gap. Accordingly, the zirconia sintered body of the present embodiment has high flexibility in terms of shape and, therefore, can be a zirconia sintered body with a complex shape. For example, the zirconia sintered body of the present embodiment may include a structure in which one of the transparent zirconia portion or the opaque zirconia portion has a protrusion-recess configuration, and the other is layered in a manner such that the protrusion-recess configuration is interlocked.

In the zirconia sintered body of the present embodiment, a ratio between the transparent zirconia portion and the opaque zirconia portion may be freely selected in accordance with a desired aesthetic property and shape. For example, the ratio between the transparent zirconia portion and the opaque zirconia portion may be 1:99 to 99:1 in terms of volume.

The zirconia sintered body of the present embodiment may have a structure in which one of the transparent zirconia portion and the opaque zirconia portion forms a pattern on a surface of the other. As referred to herein, the "pattern" is a pattern formed on one of the zirconia portions, that is, the transparent zirconia portion or the opaque zirconia portion, in a visually perceivable portion, such as a surface, of the zirconia sintered body of the present embodiment. The pattern is made of the other of the zirconia portions and is a line drawing, a figure or a combination thereof. Examples of the line drawing include lines, such as solid lines, broken lines and wavy lines, numerals, letters and symbols. Examples of the figure include polygons, such as triangles, quadrilaterals and pentagons, and geometric figures, such as circles and ellipses. Examples of the pattern include patterns formed on a region of 1 cm$^2$ or less, patterns formed on a region of 1 mm$^2$ or less, patterns formed on a region of 0.5 mm$^2$ or less, patterns formed on a region of 0.05 mm$^2$ or less and patterns formed on a region of 0.005 mm$^2$ or less. Further examples of the pattern include line drawings made of lines with a thickness of approximately 150 µm, line drawings or figures with a spacing of approximately 150 µm, figures with a diameter of 1 mm or less and figures with a diameter of 0.5 mm or less.

It is preferable that the zirconia sintered body of the present embodiment be free of color bleed so that a particularly excellent aesthetic property can be provided. It is presumed that color bleed can occur when a specific amount or more of a coloring element in one of the transparent zirconia portion or the opaque zirconia portion diffuses into the other of the zirconia portions. As referred to herein, the "coloring element" refers to an element that produces a coloring effect in the zirconia. The coloring element may be in any state of existence, that is, may be in the form of ions, an oxide, a complex oxide or the like. In the present embodiment, "color bleed" refers to a state in which a coloring element of one of the transparent zirconia portion or the opaque zirconia portion is included in the other. The color bleed may be identified visually or with an optical microscope, primarily at the interface between the transparent zirconia portion and the opaque zirconia portion and in a region (hereinafter also referred to as "transition regions") near the interface.

It is preferable that a content of a coloring element in a region of the transparent zirconia portion within 20 µm of the interface be less than or equal to 0.5 mass % so that the zirconia sintered body can have a higher level of aesthetic property. More preferably, the content is less than or equal to 0.3 mass %. The content of a coloring element in the transition region can be measured, for example, by performing composition analysis with an EPMA.

The zirconia sintered body of the present embodiment has a density determined as a ratio (g/cm$^3$) of a volume, which is measured by the Archimedes method, to a mass, which is measured by mass measurement (the ratio is hereinafter also referred to as a "measured density"). For example, the density may be 5.8 g/cm$^3$ or greater and 6.10 g/cm$^3$ or less or may be 5.9 g/cm$^3$ or greater and 6.0 g/cm$^3$ or less.

It is preferable that the zirconia sintered body of the present embodiment have a relative density of greater than or equal to 99.5%. The relative density is more preferably greater than or equal to 99.7% and even more preferably greater than or equal to 99.9%.

In the present embodiment, the relative density of the zirconia sintered body can be determined by using the following equation.

Relative density(%)=measured density (g/cm$^3$) of zirconia sintered body/apparent density (g/cm$^3$) of the zirconia sintered body×100

The measured density (sintered body density) of the zirconia sintered body is a density determined by the Archimedes method. The apparent density of the zirconia sintered body is a density calculated according to the following equation by using apparent densities and volume ratios of the transparent zirconia portion and the opaque zirconia portion.

$$M=(Ma \cdot X + Mb \cdot Y)/(X+Y)$$

In the equation, M is the apparent density (g/cm$^3$) of the zirconia sintered body, Ma is the apparent density (g/cm$^3$) of the transparent zirconia portion, Mb is the apparent density (g/cm$^3$) of the opaque zirconia portion, X is the ratio of a volume of the transparent zirconia portion to the volume of the zirconia sintered body and Y is the ratio of a volume of the opaque zirconia portion to the volume of the zirconia sintered body. Ma and Mb are densities of HIP-treated bodies of the respective sintered bodies as measured by the Archimedes method. The HIP-treated bodies are sintered bodies having a density equivalent to a relative density of 100%. The sintered bodies can be produced by performing, on a primary sintered body having a relative density of 97% or greater and less than 100%, a HIP treatment at 150 MPa and 1500° C. for 1 hour by using argon as a pressure medium.

The zirconia sintered body of the present embodiment has a biaxial flexural strength of greater than or equal to 300 MPa. If the biaxial flexural strength is less than 300 MPa, the zirconia sintered body tends to fracture, and, therefore, its use is limited. It is preferable that the zirconia sintered body of the present embodiment have a biaxial flexural strength of greater than or equal to 350 MPa so as to be used in components that are required to have higher strength. The biaxial flexural strength is more preferably greater than or equal to 400 MPa, even more preferably greater than or equal to 450 MPa, still more preferably greater than or equal to 500 MPa and still even more preferably greater than or equal to 600 MPa. Furthermore, the biaxial flexural strength of the present embodiment may be less than or equal to 2000 MPa, less than or equal to 1000 MPa, less than or equal to 900 MPa or less than or equal to 800 MPa.

In the present embodiment, the biaxial flexural strength can be measured by using a measurement method that conforms to the biaxial flexural strength measurement specified in ISO/DIS6872.

In the measurement of the biaxial flexural strength, a plurality of supports for disposing a measurement sample are used. The supports are to be disposed such that the interface that surrounds the transparent zirconia portion or the opaque zirconia portion of the measurement sample is located within a circle (support circle) that can be drawn by connecting the supports together. In the measurement sample disposed such that the interface is located within the support circle, a load having a size of less than the interface is to be applied to a center of gravity of a support diameter. In this manner, the biaxial flexural strength may be measured. For example, in instances where the measurement sample used is a zirconia sintered body having a shape in which a disc-shaped transparent zirconia portion with a diameter of 5 mm is surrounded by the opaque zirconia portion, three or more supports (e.g., three to five ceramic balls) may be disposed such that the support circle has a diameter of greater than 5 mm. The measurement may be performed by applying a load to the center of gravity (center) of the support circle by using an indenter having a diameter of less than 5 mm.

Figure 1:
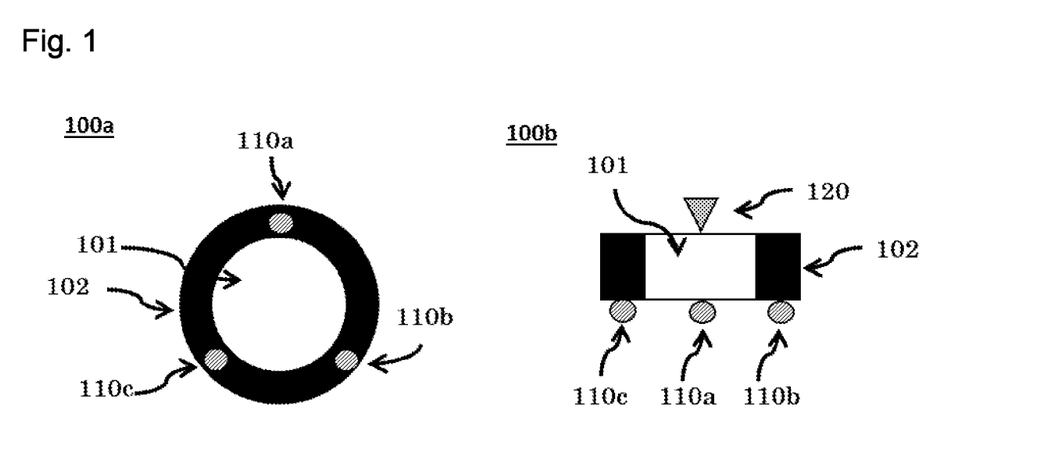
FIG. 1 presents schematic diagrams illustrating measurement of a biaxial flexural strength.

FIG. 1 presents schematic diagrams illustrating measurement of the biaxial flexural strength. In FIG. 1, a zirconia sintered body disposed on supports is illustrated. FIG. 100a is a view of the zirconia sintered body in the measurement of the biaxial flexural strength, as viewed from a lower surface (i.e., the surface at which the supports are in contact with the zirconia sintered body). FIG. 100b illustrates a cross section of the zirconia sintered body. The supports (110a to 110c) are disposed such that the transparent zirconia portion (101) is located within the support circle. The zirconia sintered body is disposed such that the opaque zirconia portion (102) are disposed on the supports. The biaxial flexural strength may be measured by applying a load (120) to a position corresponding to the center of gravity of the support circle.

In the present embodiment, the transparent zirconia portion is made of a clear zirconia sintered body, that is, a zirconia sintered body having transparency. In addition, it is preferable that the transparent zirconia portion be made of a zirconia sintered body that can be visually perceived as having transparency. More preferably, the transparent zirconia portion is made of a colorless zirconia sintered body, and even more preferably, the transparent zirconia portion is made of a zirconia sintered body having high transmittance, in particular, high linear transmittance, for incident light. It is preferable that the transparent zirconia portion have an in-line transmittance of greater than or equal to 50%. When the in-line transmittance is greater than or equal to 50%, the transparent zirconia portion can easily be visually perceived as transparent. The in-line transmittance is more preferably greater than or equal to 60% and even more preferably greater than or equal to 70%. In these cases, the transparent zirconia portion has an aesthetic property particularly suitable for use in, for example, cover members of timepieces and display members of electronic devices and the like. The in-line transmittance of the transparent zirconia portion may be less than or equal to 75%.

In the present embodiment, the "in-line transmittance" is an in-line transmittance for a sample thickness of 1 mm and a D65 light source and is a transmittance having the following relationship.

$$Ti = Tt - Td$$

Tt: total light transmittance (%)
Td: diffuse transmittance (%)
Ti: in-line transmittance (%)

The D65 light source is a standard for light sources specified by The International Commission on Illumination (Commission internationale l'eclairage, CIE) and which can substitute for a standard light source. The light source provides light corresponding to natural daylight. Accordingly, in an instance where it can be confirmed that a sample of the zirconia sintered body of the present embodiment, with a thickness of the sample being 1 mm, has a region having an in-line transmittance of 50% or greater, 60% or greater or 70% or greater, a confirmation may be made that the zirconia sintered body of the present embodiment includes a transparent zirconia portion.

It is preferable that the transparent zirconia portion be a zirconia sintered body containing zirconia having a cubic fluorite structure. The transparent zirconia portion is more preferably a zirconia sintered body containing, as a principal phase, zirconia having a cubic fluorite structure and is even more preferably a zirconia sintered body made of zirconia having a cubic fluorite structure.

It is preferable that the zirconia sintered body present in the transparent zirconia portion have an average grain size of 5 μm or greater and 200 μm or less. In the present embodiment, the average grain size is an average size of the grains of zirconia in the zirconia sintered body, and the average size can be determined from micrographs obtained with a scanning electron microscope (SEM) by using an intercept method. A surface of the sintered body may be examined at a magnification of 15,000×; from the obtained SEM micrographs, 200 or more or preferably 250±30 grains of the zirconia may be extracted; the grain size thereof may be measured by using the intercept method (k=1.78); and the results may be averaged. In this manner, the determination can be made. For example, the measurement of the average grain size may be performed as follows: a scanning electron microscope (instrument name: JSM-IT100, manufactured by JEOL Ltd.) is used; SEM micrographs are obtained under the following measurement conditions and analyzed by using an intercept method with commercially available analysis software (product name: InTouchScope); and an average of the obtained grain sizes is determined.

Acceleration voltage: 10 kV
Magnification for measurement: 400 to 10000 times

The transparent zirconia portion may have any composition provided that the transparent zirconia portion is a sintered body that exhibits transparency. The transparent zirconia portion may be made of zirconia with the zirconia containing a stabilizing agent and titania ($TiO_2$).

The stabilizing agent may be at least one selected from the group consisting of yttria ($Y_2O_3$), calcia (CaO) and magnesia (MgO). Preferably, the stabilizing agent is yttria.

It is preferable that a content of each of the one or more stabilizing agents in the transparent zirconia portion be an amount that allows the zirconia to be stabilized in the cubic fluorite structure. For example, when the stabilizing agent is yttria, a content of the yttria may be 6 mol % or greater and 12 mol % or less. The content is preferably 7 mol % or greater and 12 mol % or less, more preferably 8 mol % or greater and 11 mol % or less and even more preferably 8 mol % or greater and 10 mol % or less.

In the present embodiment, a content of the stabilizing agent is a ratio (mol %) of the stabilizing agent, calculated as an oxide, to the total of the stabilizing agent and zirconia ($ZrO_2$). That is, the content is a value determined by {[stabilizing agent (mol)]/[zirconia (mol)+stabilizing agent (mol)]}×100. Regarding the calculation of the stabilizing agent as an oxide, examples include $Y_2O_3$ for yttria, CaO for calcia and MgO for magnesia. In a zirconia sintered body in which yttria is included as a stabilizing agent, the content of the stabilizing agent (content of yttria) therein can be determined by $\{[Y_2O_3 \text{ (mol)}]/[ZrO_2 \text{ (mol)}+Y_2O_3 \text{ (mol)}]\} \times 100$.

A content of titania in the transparent zirconia portion may be 3 mol % or greater and 20 mol % or less because, with such a content, the transparency of the transparent zirconia portion tends to increase. The content is preferably 5 mol % or greater and 15 mol % or less and more preferably 8 mol % or greater and 12 mol % or less.

In the present embodiment, the content of titania is a ratio (mol %) of titania ($TiO_2$) to the total of zirconia, the stabilizing agent, calculated as an oxide, and the titania. That is, the content is a value determined by $\{[\text{titania (mol)}]/[\text{zirconia (mol)}+\text{stabilizing agent (mol)}+\text{titania (mol)}]\} \times 100$.

The transparent zirconia portion contains incidental impurities, such as hafnia ($HfO_2$), and in addition, may contain a coloring element and/or the like, provided that the transparency is not compromised. For example, the transparent zirconia portion may contain aluminum in an amount of 0 mass % or greater and 0.1 mass % or less calculated as $Al_2O_3$.

The opaque zirconia portion is made of an unclear zirconia sintered body, that is, a zirconia sintered body not having transparency. In addition, it is preferable that the opaque zirconia portion be made of a zirconia sintered body that can be visually perceived as not having transparency. More preferably, the opaque zirconia portion is made of a colored zirconia sintered body, and even more preferably, the opaque zirconia portion is made of a zirconia sintered body having low transmittance for incident light. It is preferable that the opaque zirconia portion be made of an achromatic zirconia sintered body so that visibility of the interface with the transparent zirconia portion can be increased.

It is preferable that the opaque zirconia portion have an in-line transmittance of less than 5%. The in-line transmittance is more preferably less than 4%, even more preferably less than 3% and still more preferably less than 2%. When the zirconia sintered body has an in-line transmittance of less than 5%, the zirconia sintered body can easily be visually perceived as opaque. In instances where all incident light is reflected, and/or all transmitted light is diffusely transmitted, the in-line transmittance of the zirconia sintered body is 0%. Thus, the in-line transmittance of the opaque zirconia portion may be 0% or greater. Accordingly, in an instance where a sample of the zirconia sintered body of the present embodiment, with a thickness of the sample being 1 mm, has a region having an in-line transmittance of less than 50%, less than 10%, less than 5%, less than 4% or less than 2%, a confirmation may be made that the zirconia sintered body includes an opaque zirconia portion.

It is preferable that the opaque zirconia portion be a zirconia sintered body containing zirconia having a tetragonal fluorite structure. The opaque zirconia portion is more preferably a zirconia sintered body containing, as a principal phase, zirconia having a tetragonal fluorite structure and is even more preferably a zirconia sintered body made of zirconia having a tetragonal fluorite structure.

It is preferable that the zirconia present in the opaque zirconia portion have an average grain size of 0.1 µm or greater and 50 µm or less.

The opaque zirconia portion may have any composition provided that the opaque zirconia portion is a sintered body that does not have transparency. A preferred composition of the opaque zirconia portion may include zirconia with the zirconia containing a stabilizing agent and titania. It is preferable that the opaque zirconia portion contain a coloring element, and the balance of the opaque zirconia portion be zirconia with the zirconia containing a stabilizing agent and titania.

The stabilizing agent that may be included in the opaque zirconia portion may be at least one selected from the group consisting of yttria, calcia and magnesia. Preferably, the stabilizing agent is yttria.

It is preferable that a content of each of the one or more stabilizing agents be an amount that allows the zirconia to be stabilized in the tetragonal fluorite structure. For example, when the stabilizing agent is yttria, a content of the yttria in the opaque zirconia portion may be 2 mol % or greater and 6 mol % or less. The content is preferably 2 mol % or greater and 4 mol % or less and more preferably 2.5 mol % or greater and 3.5 mol % or less.

A content of titania in the opaque zirconia portion may be 1 mol % or greater and 7 mol % or less because, with such a content, mechanical strength tends to increase. The content is preferably 1.5 mol % or greater and 6 mol % or less.

In the zirconia sintered body of the present embodiment, it is preferable that the transparent zirconia portion and the opaque zirconia portion include zirconia with the zirconia containing a stabilizing agent and titania.

In instances where the transparent zirconia portion and the opaque zirconia portion each include titania, it is preferable that a content of the titania in the opaque zirconia portion be less than that in the transparent zirconia portion. In addition, it is preferable that the difference in the content of the titania between the transparent zirconia portion and the opaque zirconia portion be 2 mol % or greater and 10 mol % or less. More preferably, the difference is 3 mol % or greater and 7 mol % or less.

The opaque zirconia portion may have any color, which may be white, red, yellow, orange, pink, green, blue, purple, gray or black. A color that gives a higher level of impression of depth and has a high level of aesthetic property may be at least one of blue and black. A color that is versatile may be one selected from the group consisting of white, gray and black. A color that is highly ornamental may be one selected from the group consisting of red, yellow, orange and pink.

It is preferable that the opaque zirconia portion include an element (coloring element) that produces a coloring effect in the zirconia, so that a color as described above can be exhibited. For example, the coloring element that may be included in the opaque zirconia portion may be at least one selected from the group consisting of transition metal elements, alkali metal elements, alkaline earth metal elements, aluminum (Al), silicon (Si), boron (B), phosphorus (P), germanium (Ge) and rare earth metals. Preferably, the coloring element is at least one selected from the group consisting of aluminum, nickel (Ni), cobalt (Co), manganese (Mn), iron (Fe), cerium (Ce), praseodymium (Pr), neodymium (Nd), europium (Eu) and erbium (Er). More preferably, the coloring element is one or more selected from the group consisting of aluminum, cobalt and iron. For example, the sintered body of the present embodiment may include, as coloring elements, any of the following: at least cobalt and iron; at least cobalt, iron and manganese; at least cobalt, iron and aluminum; and at least cobalt, iron, aluminum and manganese.

The opaque zirconia portion may contain incidental impurities, such as hafnia, but it is preferable that the opaque zirconia portion not contain zinc (Zn) or chromium (Cr); a content of zinc and a content of chromium may each be 0 mass % or greater and less than 0.1 mass % or 0.05 mass % or less and are preferably less than or equal to a detection limit (e.g., less than or equal to 0.005 mass %) for a typical composition analysis. A total content of zinc and chromium is a content calculated as oxides and is a ratio of the total mass of zinc and chromium, with the zinc being calculated as zinc oxide (ZnO) and the chromium as chromium oxide ($Cr_2O_3$), to the mass of the opaque zirconia portion.

The opaque zirconia portion may have a color in which, according to the L*a*b* color system, the lightness L* is 10 or less, the hue a* is −2.00 or greater and 2.00 or less and the hue b* is −2.00 or greater and 5.00 or less, for example, so that the interface between the transparent zirconia portion and the opaque zirconia portion can be visually perceived clearly. Furthermore, preferred colors of the opaque zirconia portion may be as follows: the lightness L* is 0 or greater and 9.0 or less, preferably 0 or greater and 5.5 or less and more preferably 0 or greater and less than 3.0; the hue a* is −3.00 or greater and 2.00 or less, preferably −0.1 or greater and 0.80 or less and more preferably −0.50 or greater and 0.50 or less; and the hue b* is −2.00 or greater and 4.00 or less, preferably −1.50 or greater and 2.50 or less and more preferably −1.00 or greater and 1.00 or less.

The color according to the L*a*b* color system can be determined by measuring a sintered body having a surface roughness (Ra) of 0.02 nm or less, by using a method that conforms to JIS Z 8722. The color can be measured by using a common color difference meter (e.g., Spectrophotometer SD 3000, manufactured by Nippon Denshoku Industries Co., Ltd.). In the measurement of the color, a white plate is used as the background (so-called white-background measurement), and the conditions for the measurement may be as follows, for example.

Light source: D65 light source
Viewing angle: 10°
Measurement mode: SCE

It is preferable that the opaque zirconia portion have a monoclinic phase fraction of less than or equal to 10%. The monoclinic phase fraction is more preferably less than or equal to 6.5%, even more preferably less than or equal to 2% and particularly preferably less than or equal to 1%. The monoclinic phase fraction is a value determined from XRD patterns of a surface of the sintered body, according to the following equation.

Monoclinic phase fraction(%)=$[I_m(111)+I_m(11-1)] \times 100/[I_m(111)+I_m(11-1)+I_t(111)+I_c(111)]$ In the equation, $I_m(111)$ is an integrated intensity of the (111) plane of monoclinic zirconia, $I_m(11-1)$ is an integrated intensity of the (11-1) plane of the monoclinic zirconia, $I_t(111)$ is an integrated intensity of the (111) plane of tetragonal zirconia and $I_c(111)$ is an integrated intensity of the (111) plane of cubic zirconia. The XRD patterns of the sintered body may be measured by using a common XRD instrument (e.g., instrument name: RINT-UltimaIII, manufactured by Rigaku Corporation), and the conditions for the measurement may be as follows, for example.

Radiation source: CuKα radiation (λ=0.15418 nm)
Measurement mode: continuous scanning
Scan speed: 4°/minute
Step size: 0.02°
Measurement range: 2θ=26° to 33°

Furthermore, the peak intensity of each of the planes can be determined by analyzing the obtained XRD patterns with commercially available analysis software (e.g., RINT-UltimaIII, manufactured by Rigaku Corporation).

It is preferable that the zirconia present in the opaque zirconia portion have an average grain size of less than or equal to 3.0 μm. More preferably, the average grain size is less than or equal to 2.5 μm. Particularly preferably, the average grain size is 0.3 μm or greater and 2.5 μm or less or 0.5 μm or greater and 1.3 μm or less.

A zirconia sintered body suitable for the opaque zirconia portion may be a zirconia sintered body (hereinafter also referred to as a "black zirconia sintered body") that includes a cobalt- and iron-containing solid solution, with the balance being zirconia; a total content of the cobalt and the iron may be greater than 0.1 mass % and less than 3.0 mass % where the content of the cobalt is calculated as $Co_3O_4$, and the content of the iron is calculated as $Fe_2O_3$.

Regarding the black zirconia sintered body, it is preferable that, in an elemental map produced by an electron probe microanalyzer, a ratio of a region of cobalt greater than 5.0 $μm^2$ be less than or equal to 15%. More preferably, the ratio is less than or equal to 5%.

It is preferable that the black zirconia sintered body contain at least one selected from the group consisting of vanadia and titania. It is more preferable that the black zirconia sintered body contain titania.

It is preferable that the black zirconia sintered body contain aluminum. A content of the aluminum may be 0.1 mass % or greater and 3.0 mass % or less; preferably, the content is 0.1 mass % or greater and 2.0 mass % or less, and more preferably, 0.1 mass % or greater and 1.0 mass % or less. The content of the aluminum is a ratio of a mass of aluminum calculated as $Al_2O_3$ and relative to a mass of the black zirconia sintered body.

The black zirconia sintered body may contain manganese. A content of the manganese may be 0.1 mass % or greater and 5.0 mass % or less; preferably, the content is 0.2 mass % or greater and 3.0 mass % or less, and more preferably, 0.3 mass % or greater and 2.5 mass % or less. The content of the manganese is a ratio of a mass of manganese calculated as $Mn_3O_4$ and relative to the mass of the black zirconia sintered body.

The black zirconia sintered body may contain silica. A content of the silica may be 0.1 mass % or greater and 5.0 mass % or less; preferably, the content is 0.2 mass % or greater and 3.0 mass % or less, and more preferably, 0.3 mass % or greater and 2.5 mass % or less. The content of the silica is a ratio of a mass of silicon calculated as $SiO_2$ and relative to the mass of the black zirconia sintered body.

For example, in an instance where the sintered body contains cobalt, iron, manganese and aluminum, and the balance of the sintered body is zirconia with the zirconia containing titania and yttria, the content (mass %) of the aluminum can be determined by $Al_2O_3$ (g)/{$Y_2O_3$ (g)+$ZrO_2$ (g)+$TiO_2$ (g) $Fe_2O_3$ (g)+$Co_3O_4$ (g)+$Mn_3O_4$ (g)+$Al_2O_3$ (g)}×100, and the content (mass %) of the manganese can be determined by $Mn_3O_4$ (g)/{$Y_2O_3$ (g)+$ZrO_2$ (g) $TiO_2$ (g)+$Fe_2O_3$ (g)+$Co_3O_4$ (g)+$Mn_3O_4$ (g)+$Al_2O_3$ (g)}×100.

Particularly preferred compositions of the black zirconia sintered body include a composition that contains cobalt in an amount of 0.02 mass % or greater and 0.2 mass % or less calculated as $Co_3O_4$, iron in an amount of 0.03 mass % or greater and 0.5 mass % or less calculated as $Fe_2O_3$ and aluminum in an amount of 0.1 mass % or greater and 20 mass % or less calculated as $Al_2O_3$, with the balance being zirconia, the zirconia containing titania in an amount of 2 mol % or greater and 6 mol % or less and yttria in an amount of 2 mol % or greater and 5 mol % or less; and a composition that contains cobalt in an amount of 0.02 mass % or greater and 0.2 mass % or less calculated as $Co_3O_4$, iron in an amount of 0.03 mass % or greater and 0.5 mass % or less calculated as $Fe_2O_3$ and aluminum in an amount of 0.1 mass % or greater and 2 mass % or less calculated as $Al_2O_3$, with the balance being zirconia, the zirconia containing titania in an amount of 2 mol % or greater and 6 mol % or less and yttria in an amount of 2 mol % or greater and 4 mol % or less.

Now, a method for producing the zirconia sintered body of the present embodiment will be described.

The zirconia sintered body of the present embodiment can be produced by using a production method comprising a sintering step. The sintering step includes sintering a secondary green body in which a primary green body and a different green body are layered. The primary green body is made from one of a raw material powder for the transparent zirconia portion or a raw material powder for the opaque zirconia portion. The different green body is made from the other of the raw material powders.

The green body to be subjected to the sintering step is a secondary green body in which a primary green body and a different green body are layered (hereinafter also referred to simply as a "secondary green body"). The primary green body is a green body made from one of a raw material powder for the transparent zirconia portion (hereinafter also referred to as a "transparent raw material") or a raw material powder for the opaque zirconia portion (hereinafter also referred to as an "opaque raw material") (this green body is hereinafter also referred to simply as a "primary green body"). The different green body is a green body made from the other of the raw material powders.

The primary green body is one of a green body made from a transparent raw material (hereinafter also referred to as a "transparent green body") or a green body made from an opaque raw material (hereinafter also referred to as an "opaque green body"). The secondary green body is a green body in which the primary green body and the different green body made from the other of the raw material powders are layered, that is, a green body formed of the transparent green body and the opaque green body. In a preferred embodiment, the secondary green body is a green body in which the transparent green body and the opaque green body are joined to each other. Note that regarding the green body, "primary" and "secondary" are terms used for convenience to describe the state in which layers are disposed and are therefore not intended to indicate any order or vertical positional relationship.

The primary green body and the secondary green body may each have any shape, which may be configured to be similar to a shape of the target sintered body, with shrinkage due to sintering taken into account. In addition, the secondary green body may have a structure in which the primary green body has a structure including at least one of a protrusion configuration and a recess configuration, and the different green body made from the other of the raw material powders is layered thereon to cover the structure.

A method for producing the primary green body and a method for producing the secondary green body are not limited. An exemplary forming method is the following method, in which the primary green body and the secondary green body are simultaneously obtained. First, one of the transparent raw material or the opaque raw material is loaded into a mold; next, the other of the raw material powders is layered on the one of the raw material powders; and the resultant is formed. Furthermore, another exemplary forming method is a method in which, first, one of the raw material powders is loaded into a mold and formed to provide the primary green body; and next, forming is carried out by layering the other of the raw material powders on the primary green body to provide the secondary green body. Another exemplary forming method is a method in which one of the raw material powders is loaded into a mold and formed to provide the primary green body; next, the primary green body is placed in a mold for the secondary green body; and then, forming is carried out by layering the other of the raw material powders on the primary green body to provide the secondary green body.

The forming method for the primary green body and the forming method for the secondary green body may each be a known forming method, and an example thereof is at least one forming method selected from the group consisting of uniaxial pressing, cold isostatic pressing (CIP) treatment, slip casting, sheet forming and injection molding. Preferably, the forming method is one or more selected from the group consisting of uniaxial pressing, CIP treatment and injection molding.

When the forming method is uniaxial pressing, an exemplary uniaxial pressing condition is 20 MPa or greater and 70 MPa or less. When the forming method is CIP treatment, an exemplary CIP treatment condition is 150 MPa or greater and 250 MPa or less. When the forming method is injection molding, an exemplary injection molding condition is 50 MPa or greater and 150 MPa or less or 70 MPa or greater and 130 MPa or less.

The transparent raw material is a precursor of the transparent zirconia portion, and the opaque raw material is a precursor of the opaque zirconia portion. Typically, the transparent raw material and the opaque raw material are powders that have compositions different from each other. It is sufficient that these raw material powders have respective compositions that form a corresponding one of the transparent zirconia sintered body and the opaque zirconia sintered body as a result of sintering.

It is preferable that the transparent raw material and the opaque raw material each be a mixed powder that includes a zirconia source, a stabilizing agent source and a titania source. It is more preferable that the transparent raw material and the opaque raw material each be a mixed powder that includes a stabilizing-agent-containing zirconia source and a titania source. In addition, the transparent raw material and the opaque raw material may include at least one coloring element source.

The zirconia source is zirconia or a precursor thereof. Preferably, the zirconia source is zirconia in a state resulting from heating of a zirconia sol, more preferably, zirconia in a state resulting from heating of a zirconia sol prepared by at least one of a hydrothermal synthesis method and a hydrolysis method and even more preferably, zirconia in a state resulting from heating of a zirconia sol prepared by a hydrolysis method.

The stabilizing agent source is a stabilizing agent or a precursor thereof and may be, for example, one or more selected from the group consisting of stabilizing-element-containing oxides, stabilizing-element-containing chlorides and stabilizing-element-containing hydroxides. When the stabilizing agent is yttria, the stabilizing agent source (yttria source) may be, for example, one or more selected from the group consisting of yttria, yttrium chloride and yttrium hydroxide. Preferably, the stabilizing agent source is at least one of yttria and yttrium chloride. When the stabilizing agent is calcia, the stabilizing agent source (calcia source) may be, for example, at least one selected from the group consisting of calcia, calcium chloride and calcium hydroxide. Preferably, the stabilizing agent source is at least one of calcia and calcium chloride. When the stabilizing agent is magnesia, the stabilizing agent source (magnesia source) may be, for example, at least one selected from the group consisting of magnesia, magnesium chloride and magnesium hydroxide. Preferably, the stabilizing agent source is at least one of magnesia and magnesium chloride.

The titania source is titania or a precursor thereof and may be, for example, one or more selected from the group consisting of titania, titanium chloride, titanium hydroxide and titanium tetraisopropoxide. Preferably, the titania source is at least one of titania and titanium chloride, and more preferably, titania. More preferably, the titania source may be a titania powder with a purity of 99.9% or greater, a BET specific surface area of 10 m$^2$/g or greater and 100 m$^2$/g or less, an average crystallite size of 30 nm or less and an average secondary particle size of 500 nm or less. Furthermore, it is preferable that the titania powder be a titania powder prepared by at least one of a sulfuric acid method and a gas-phase pyrolysis method. It is preferable that the titania source have a BET specific surface area greater than those of the zirconia source and the stabilizing-agent-containing zirconia source.

The stabilizing-agent-containing zirconia source is zirconia in which a stabilizing agent is dissolved and may be, for example, one or more selected from the group consisting of yttria-containing zirconia, calcia-containing zirconia and magnesia-containing zirconia. Preferably, the stabilizing-agent-containing zirconia source is yttria-containing zirconia. Preferably, the yttria-containing zirconia source may be a yttria-containing zirconia powder with a purity of 99.9% or greater, a BET specific surface area of 5 m$^2$/g or greater and 20 m$^2$/g or less, an average crystallite size of 10 nm or greater and 50 nm or less and an average secondary particle size of 100 nm or greater and 500 nm or less. Furthermore, it is preferable that the yttria-containing zirconia powder be a yttria-containing zirconia powder prepared by at least one of a hydrothermal synthesis method and a hydrolysis method.

The coloring element source enables the zirconia portion to exhibit any suitable color. The coloring element source is a compound containing a coloring element and may be, for example, one or more selected from the group consisting of oxides, hydroxides, oxyhydroxides, chlorides, sulfides, acetate salts, nitrate salts and sulfate salts, of coloring elements. Preferably, the coloring element source is one or more selected from the group consisting of oxides, hydroxides and oxyhydroxides, of coloring elements. When the coloring element is cobalt, the coloring element source (cobalt source) is a compound containing cobalt (Co) and may be, for example, at least one selected from the group consisting of tricobalt tetraoxide (Co$_3$O$_4$), cobalt oxide (III) (Co$_2$O$_3$), cobalt oxide (II) (CoO), cobalt oxyhydroxide (CoOOH), cobalt hydroxide (Co(OH)$_2$), cobalt nitrate (Co(NO$_3$)$_2$), cobalt chloride (CoCl$_2$) and cobalt sulfate (CoSO$_4$). Preferably, the coloring element source is at least one selected from the group consisting of Co$_3$O$_4$, Co$_2$O$_3$, CoO and CoOOH.

When the coloring element is iron, the coloring element source (iron source) is a compound containing iron (Fe) and may be, for example, at least one selected from the group consisting of iron oxide (III, II) (Fe$_3$O$_4$), iron oxide (III) (Fe$_2$O$_3$), iron oxide (II) (FeO), iron oxyhydroxide (FeOOH), iron hydroxide (FeOH), iron nitrate (Fe(NO$_3$)$_2$), iron chloride (FeCl) and iron sulfate (FeSO$_4$). Preferably, the coloring element source is at least one selected from the group consisting of Fe$_3$O$_4$, Fe$_2$O$_3$, FeO and FeOOH.

When the coloring element is aluminum, the coloring element source (aluminum source) is a compound containing aluminum (Al) and may be, for example, at least one selected from the group consisting of alumina (Al$_2$O$_3$), aluminum hydroxide (Al(OH)$_3$), aluminum chloride (AlCl$_3$), aluminum isopropoxide (C$_9$H$_{21}$O$_3$Al) and aluminum nitrate (Al(NO$_3$)$_3$). Preferably, the coloring element source is at least one of alumina and aluminum hydroxide.

When the coloring element is manganese, the coloring element source (manganese source) is a compound containing manganese (Mn) and may be at least one selected from the group consisting of manganese oxide (MnO), manganese dioxide (MnO$_2$), trimanganese tetraoxide (Mn$_3$O$_4$), manganese hydroxide (Mn(OH)$_2$), manganese oxyhydroxide (MnOOH), manganese sulfate (MnSO$_4$), manganese nitrate (Mn(NO$_3$)$_2$) and manganese chloride (MnCl$_2$). Preferably, the coloring element source is one or more selected from the group consisting of manganese dioxide, trimanganese tetraoxide and manganese hydroxide.

When the coloring element is silicon, the coloring element source (silicon source) is a compound containing silicon (Si) and may be at least one selected from the group consisting of colloidal silica, precipitated silica, amorphous silica, sodium silicate, tetraethyl orthosilicate and silica powder. Preferably, the coloring element source is silica powder.

It is preferable that a content of the stabilizing agent in the transparent raw material be an amount that allows the zirconia to be stabilized in the cubic fluorite structure as a result of sintering. For example, when the stabilizing agent is yttria, a content of the yttria may be 6 mol % or greater and 12 mol % or less. The content is preferably 7 mol % or greater and 12 mol % or less, more preferably 8 mol % or greater and 11 mol % or less and even more preferably 8 mol % or greater and 10 mol % or less.

A content of titania in the transparent raw material may be 3 mol % or greater and 20 mol % or less. The content is preferably 5 mol % or greater and 15 mol % or less and more preferably 8 mol % or greater and 12 mol % or less.

It is preferable that a content of the stabilizing agent in the opaque raw material be an amount that allows the zirconia to be stabilized in the tetragonal fluorite structure as a result of sintering. For example, when the stabilizing agent is yttria, a content of the yttria may be 2 mol % or greater and 6 mol % or less. The content is preferably 2 mol % or greater and 4 mol % or less and more preferably 2.5 mol % or greater and 3.5 mol % or less.

A content of titania in the opaque raw material may be 1 mol % or greater and 7 mol % or less. The content is preferably 1.5 mol % or greater and 6 mol % or less.

A content of the coloring element source in the opaque raw material may be any content that is in accordance with the target color; for example, the content may be 0.01 mass % or greater and 50 mass % or less. The content is preferably 0.1 mass % or greater and 20 mass % or less and more preferably 0.3 mass % or greater and 10 mass % or less. Examples of the contents of the coloring element sources are as follows: a mass of cobalt calculated as Co$_3$O$_4$ is 0.1 mass % or greater and 5 mass % or less relative to a mass of the opaque raw material; a mass of iron calculated as Fe$_2$O$_3$ is 0.1 mass % or greater and 5 mass % or less relative to the mass of the opaque raw material; a mass of nickel calculated as NiO is 0.1 mass % or greater and 10 mass % or less relative to the mass of the opaque raw material; and a mass of aluminum calculated as Al$_2$O$_3$ is 0.1 mass % or greater and 40 mass % or less relative to the mass of the opaque raw material.

At least one of the transparent raw material and the opaque raw material may include an organic binder so that the flowability of the raw material powder can be improved. In instances where an organic binder is included, a content of the organic binder in each of the raw material powders may be, for example, 25 vol % or greater and 65 vol % or less or 35 vol % or greater and 60 vol % or less.

The organic binder may be a known organic binder that is used in molding a ceramic powder. For example, the organic binder may be one that includes at least one selected from the group consisting of acrylic resins, waxes and plasticizing agents. In the present embodiment, the acrylic resin may be a polymer including at least one of acrylic acid ester residue units or methacrylic acid ester residue units.

It is preferable that the transparent raw material and the opaque raw material each be in a state in which the zirconia source and other raw materials are homogeneously mixed. Any mixing method may be used for mixing the raw materials, and using at least one of dry mixing and wet mixing is sufficient, with wet mixing being preferable. A preferred example of wet mixing is mixing performed in at least one of a ball mill and a stirring mill. It is preferable that the wet mixing be mixing performed in a ball mill by using zirconia balls having a diameter of 1.0 mm or greater and 10.0 mm or less. In instances where a coloring element is to be included, it is more preferable that the coloring element source be mixed before the zirconia source and the coloring element source are mixed together.

In instances where the raw material powder is to include an organic binder, any mixing method may be used provided that the raw material powder and the organic binder can be homogeneously mixed. The mixing method may be, for example, one of heating/kneading and wet mixing.

In instances where a zirconia sintered body including an opaque zirconia portion made of a black zirconia sintered body is to be obtained, it is preferable that the opaque raw material (hereinafter also referred to as a "black raw material") be a mixed powder that contains a cobalt source, an iron source and an aluminum source, and the balance of the mixed powder be zirconia with the zirconia containing yttria and titania; and it is preferable that the mixed powder contain cobalt in an amount of 0.02 mass % or greater and 0.2 mass % or less calculated as $Co_3O_4$, iron in an amount of 0.03 mass % or greater and 0.5 mass % or less calculated as $Fe_2O_3$ and aluminum in an amount of 0.1 mass % or greater and 30 mass % or less calculated as $Al_2O_3$, and the balance of the mixed powder be zirconia with the zirconia containing titania in an amount of 2 mol % or greater and 6 mol % or less and yttria in an amount of 2 mol % or greater and 4 mol % or less. The black raw material may contain at least one of a manganese source and a silica source or may contain a manganese source, as necessary.

In the black raw material, a ratio between the cobalt source and the iron source is not limited and preferably as follows: for the cobalt and the iron in the black raw material, calculated as $Co_3O_4$ and $Fe_2O_3$, respectively, a weight ratio $Co_3O_4/(Co_3O_4+Fe_2O_3)$ is 0.10 or greater and 0.99 or less; more preferably, the weight ratio is 0.10 or greater and 0.50 or less.

In the black raw material, the cobalt source, the iron source and the aluminum source may exist in a state of a complex oxide containing two or more selected from the group consisting of cobalt, iron and aluminum. The complex oxide may be, for example, one or more selected from the group consisting of $CoFe_2O_4$ (cobalt ferrite), $CoAl_2O_4$ (cobalt aluminate), $FeAl_2O_4$ and $FeAlO_3$. Preferably, the complex oxide is $CoAl_2O_4$.

It is preferable that a difference in a linear shrinkage rate between the transparent raw material and the opaque raw material (hereinafter also referred to simply as a "difference in the linear shrinkage rate") be less than or equal to 5.0%. In general, the difference in thermal shrinkage behavior between a transparent raw material and an opaque raw material is large compared with that between transparent raw materials or between opaque raw materials. Accordingly, in instances where a transparent raw material and an opaque raw material are sintered together, defects are likely to occur, which is likely to result in a significantly low yield. In contrast, in the present embodiment, the difference in the linear shrinkage rate is less than or equal to 5.5% or less than or equal to 5.0%, and as a result, defects due to sintering are inhibited from occurring, which is likely to result in a high yield. The difference in the linear shrinkage rate is less than or equal to 4.5%, less than or equal to 4.0%, less than or equal to 3.5%, less than or equal to 3.0%, less than or equal to 2.5% or less than or equal to 2.0%. Since raw material powders having different compositions are unlikely to have the same linear shrinkage rate, the difference in the linear shrinkage rate may be greater than or equal to 0% or greater than or equal to 0.1%.

In the present embodiment, the "linear shrinkage rate" is an index for thermal shrinkage behavior and can be determined as follows. A heat treatment is performed on a measurement sample, which is a sample having a rectangular parallelepiped shape (e.g., a sample having a rectangular parallelepiped shape with a width of 30 mm, a thickness of 3 mm and a length of 40 mm) (hereinafter also referred to as a "rectangular parallelepiped sample") or a sample having a disc shape (e.g., a sample having a disc shape with a diameter of 22 mm and a thickness of 1 mm) (hereinafter also referred to as a "disc-shaped sample"). Values before and after the heat treatment are used in the following equation.

<Rectangular Parallelepiped Sample>

$$S_1 = (S_W + S_T + S_L)/3$$

In the equation, $$S_W = 100 \times \{(L_{w2} - L_{w1})/L_{w1}\}$$

$$S_T = 100 \times \{(L_{T2} - L_{T1})/L_{T1}\}$$

$$S_L = 100 \times \{(L_{L2} - L_{L1})/L_{L1}\}$$

Furthermore, $S_1$ is the linear shrinkage rate(%) of a rectangular parallelepiped sample, $S_W$ is the linear shrinkage rate(%) in width, $L_{w1}$ is the width (mm) of the rectangular parallelepiped sample before heat treatment, $L_{w2}$ is the width (mm) of the rectangular parallelepiped sample after heat treatment, $S_T$ is the linear shrinkage rate(%) in thickness, $L_{T1}$ is the thickness (mm) of the rectangular parallelepiped sample before heat treatment, $L_{T2}$ is the thickness (mm) of the rectangular parallelepiped sample after heat treatment, $S_L$ is the linear shrinkage rate(%) in length, LTA is the length (mm) of the rectangular parallelepiped sample before heat treatment and $L_{L2}$ is the length (mm) of the rectangular parallelepiped sample after heat treatment. Note that the width, thickness and length may be measured by using a caliper.

<Disc-Shaped Sample>

$$S_2 = (S_D + S_H)/2$$

In the equation, $$S_D = 100 \times \{(L_{D2} - L_{D1})/L_{D1}\}$$

$$S_H = 100 \times \{(L_{H2} - L_{H1})/L_{H1}\}$$

Furthermore, $S_2$ is the linear shrinkage rate(%) of a disc-shaped sample, $S_D$ is the linear shrinkage rate(%) in diameter, $L_{D1}$ is the diameter (mm) of the disc-shaped sample before heat treatment, $L_{D2}$ is the diameter (mm) of the disc-shaped sample after heat treatment, $S_H$ is the linear shrinkage rate(%) in thickness, $L_{H1}$ is the thickness (mm) of the disc-shaped sample before heat treatment and $L_{H2}$ is the thickness (mm) of the disc-shaped sample after heat treatment. Note that the diameter and thickness may be measured by using a caliper. Furthermore, for the diameter, a measurement may be performed at two or three points, and an average of the results may be used.

In the present embodiment, for the heat treatment for the measurement of the linear shrinkage, the heating may be performed in air by using a heating program in which a heating rate of 100° C./h and a holding temperature of 1300° C., 1400° C. or 1500° C. are set, and a holding time of 1 minute and a cooling rate of 200° C./h are specified.

In the present embodiment, it is preferable that one of the following satisfy the above-mentioned difference in the linear shrinkage rate: the difference in the linear shrinkage rate in the heat treatment with a holding temperature of 1300° C. (hereinafter also referred to as $\Delta S_{(1300)}$), the difference in the linear shrinkage rate in the heat treatment with a holding temperature of 1400° C. (hereinafter also referred to as $\Delta S_{(1400)}$) or the difference in the linear shrinkage rate in the heat treatment with a holding temperature of 1500° C. (hereinafter also referred to as $\Delta S_{(1500)}$). It is more preferable that at least the maximum value (hereinafter also referred to as $\Delta S_{(MAX)}$) of $\Delta S_{(1300)}$, $\Delta S_{(1400)}$ and $\Delta S_{(1500)}$ satisfy any of the above-mentioned values, and it is even more preferable that at least $\Delta S_{(1400)}$ satisfy any of the above-mentioned values.

Preferred $\Delta S_{(1300)}$ may be greater than or equal to 0%, and $\Delta S_{(1300)}$ is preferably greater than or equal to 0.1%; in addition, $\Delta S_{(1300)}$ may be less than or equal to 5.0% and is preferably less than or equal to 4.5%, more preferably less than or equal to 3.5%, even more preferably less than or equal to 3.0%, still more preferably less than or equal to 2.0% and still even more preferably less than or equal to 1.0%. Preferred $\Delta S_{(1400)}$ may be greater than or equal to 0%, and $\Delta S_{(1400)}$ is preferably greater than or equal to 0.5%; in addition, $\Delta S_{(1400)}$ may be less than or equal to 5.0% and is preferably less than or equal to 4.5%, more preferably less than or equal to 4.0% and even more preferably less than or equal to 3.5%. Furthermore, preferred $\Delta S_{(1500)}$ may be greater than or equal to 0%, and $\Delta S_{(1500)}$ is preferably greater than or equal to 0.1%; in addition, $\Delta S_{(1500)}$ may be less than or equal to 3.0% and is preferably less than or equal to 2.0%, more preferably less than or equal to 1.8%, even more preferably less than or equal to 1.5% and still more preferably less than or equal to 1.0%. The difference between $\Delta S_{(1300)}$ and $\Delta S_{(1500)}$ may be 0% or greater and 4.0% or less. More preferably, the difference is 0% or greater and 3.0% or less, 0% or greater and 2.5% or less, 0% or greater and 1.5% or less, 0% or greater and 1.0% or less or 0.1% or greater and 0.5% or less.

In the sintering step, the secondary green body is sintered, and, accordingly, a zirconia sintered body in which the transparent zirconia portion and the opaque zirconia portion are joined to each other can be obtained.

A sintering temperature for sintering the secondary green body is preferably greater than 1100° C., more preferably greater than or equal to 1200° C. and even more preferably greater than or equal to 1250° C. The sintering temperature may be a temperature that can be used in a typical sintering device and may be less than or equal to 1700° C. or less than or equal to 1600° C.

In the sintering step, any sintering method may be employed, and the method may be, for example, one or more selected from the group consisting of pressureless sintering, microwave heating and hot isostatic pressing treatment (hereinafter also referred to as "HIP treatment"). It is preferable that in the sintering step, the sintering include at least a HIP treatment so that the occurrence of defects at the interface between the transparent zirconia portion and the opaque zirconia portion can be inhibited. More preferably, the sintering includes pressureless sintering and a HIP treatment. Note that in the present embodiment, "pressureless sintering" refers to a method of sintering in which heating is carried out without applying external pressure to the heating target. With pressureless sintering, a pressureless-sintered body can be obtained.

In a preferred sintering method, the sintering may be carried out such that pressureless sintering is performed at a temperature of 1300° C. or greater and 1400° C. or less, and subsequently, a HIP treatment is performed at a temperature of 1450° C. or greater and 1550° C. or less. Accordingly, the zirconia sintered body of the present embodiment can be a HIP-treated body.

For the pressureless sintering, although the conditions other than the sintering temperature are not limited, a sintering atmosphere may be one of an oxidizing atmosphere and an air atmosphere and is preferably an air atmosphere, and a sintering time may be 30 minutes or more and 5 hours or less and is preferably 1 hour or more and 3 hours or less.

For the HIP treatment, although the conditions other than the HIP treatment temperature are not limited, a pressure medium to be used may be an inert gas and is preferably at least one of nitrogen and argon, a HIP pressure may be 50 MPa or greater and 200 MPa or less and a HIP treatment time may be 0.5 hours or more and 10 hours or less. It is preferable that a HIP treatment atmosphere be an atmosphere other than an oxidizing atmosphere. More preferably, the atmosphere is at least one of a reducing atmosphere and an inert atmosphere, and even more preferably, a reducing atmosphere.

In the HIP treatment, it is preferable that the sample being sintered by HIP be disposed in a reducing atmosphere, and it is preferable that the sample be placed in a container made of a reducing material. In general, in HIP treatment apparatuses, constituent components, such as a heating element, contain a reducing substance, such as carbon. Accordingly, even if an inert gas is used as a pressure medium, the atmosphere for a HIP treatment is likely to become a weakly reducing atmosphere, which is an unstable atmosphere, from the inert atmosphere. However, in the instance where the sample being sintered by HIP is disposed in a reducing atmosphere, the zirconia sintered body of the present embodiment can be readily obtained stably. Methods for controlling the atmosphere in which the HIP treatment proceeds, in particular, the atmosphere near the sample in which the HIP treatment proceeds, are not limited. It is convenient to place the sample in a container made of a reducing material. With a selection of the material of the container in which the sample is to be placed for the HIP treatment, the atmosphere near the sample can be stabilized. For example, the sample may be placed in a container made of an oxide ceramic, such as alumina, zirconia or mullite. In these instances, the sample being sintered by HIP can be disposed in an inert atmosphere. On the other hand, the sample may be placed in a container made of a reducing material, such as carbon. In this instance, the sample being treated by HIP can be disposed in a reducing atmosphere.

In the sintering step, it is preferable that annealing be performed after sintering. In this instance, the in-line transmittance of the transparent zirconia portion is further increased. The conditions for the annealing are not limited. For example, the conditions may include an oxygen atmosphere (e.g., an air atmosphere), a treatment temperature of 850° C. or greater and 950° C. or less and a treatment time of 0.5 to 2 hours.

The production method of the present embodiment may include a processing step for processing the zirconia sintered body into any suitable shape. With the processing, aesthetic properties that are more suitable for the intended use can be imparted; for example, the transparent zirconia portion and the opaque zirconia portion can be exposed in the same plane, a surface can be made smoother and a shape can be modified.

As a method for the processing, any method can be used, and, for example, the method may be one or more selected from the group consisting of lathing, flat grinding, round grinding and NC machining (numerical control machining). To enhance gloss, a polishing process may be used, and an example thereof is at least one of barrel polishing and round polishing.

EXAMPLES

Now, the zirconia sintered body of the present disclosure will be described in detail with reference to examples and comparative examples. It should be noted that the present disclosure is not limited to the examples described below.
(In-Line Transmittance)

A disc-shaped sintered body having a thickness of 1 mm and a diameter of 25 mm was prepared, both surfaces of the sintered body were mirror-polished to a surface roughness Ra of 0.02 μm or less and the resultant was used as a measurement sample. The in-line transmittance was measured by using a haze meter (instrument name: NDH 5000, manufactured by Nippon Denshoku Industries Co., Ltd.). The incident light was D65 light, and the spot diameter was 15 mm.
(Color)

The color of the opaque zirconia portion was measured by using a method that conforms to JIS Z 8722. In the measurement, a common color difference meter (instrument name: Spectrophotometer SD 3000, manufactured by Nippon Denshoku Industries Co., Ltd.) was used, a white plate was used as the background and the sample was positioned on the white plate and measured (white-background measurement). The measurement conditions were as follows.

Light source: D65 light source
Viewing angle: 10°
Measurement mode: SCE mode (a mode in which specular light is excluded, and diffuse light is measured)

Regarding the color, the measurement sample used was a zirconia sintered body provided with a surface roughness Ra of 0.02 μm or less. The opaque zirconia portion was visually determined, and the color thereof was measured.
(Measurement of Difference in Linear Shrinkage Rate)

A powder sample was pressed in a mold at a pressure of 25 MPa, and subsequently, the resultant was treated by CIP at a pressure of 200 MPa. Accordingly, a green body having a rectangular parallelepiped shape with a width of 30 mm, a thickness of 3 mm and a length of 40 mm and a green body having a disc shape with a diameter of 22 mm and a thickness of 1 mm were obtained. The green bodies were used as measurement samples. By using a caliper, the width ($L_{w1}$), thickness ($L_{T1}$) and length ($L_{L1}$) of the sample were measured for the rectangular parallelepiped sample, and the diameter ($L_{D1}$) and thickness ($L_{H1}$) of the sample were measured for the disc-shaped sample. After the measurement, a heat treatment was performed on the green bodies by using a common heating furnace (apparatus name: SC-2025H, manufactured by Motoyama Co., Ltd.). The heat treatment was performed in air with a heating program in which the heating rate was 100° C./h, the holding temperature was 1300° C., 1400° C. or 1500° C., the holding time was 1 minute and the cooling rate was 200° C./h. For the measurement samples after the heat treatment, which was performed with the heating program with each of the specified holding temperatures, a measurement was performed. By using a caliper, the width ($L_{w2}$), thickness ($L_{T2}$) and length ($L_{L2}$) were measured for rectangular parallelepiped samples, and the diameter ($L_{D2}$) and thickness ($L_{H2}$) of the sample were measured for the disc-shaped sample. From the obtained values, the individual linear shrinkage rates were determined, and averages thereof were designated as the linear shrinkage rates ($S_1$ and $S_2$) of the sample for each of the holding temperatures. The difference in the linear shrinkage rate was determined as the difference between the linear shrinkage rates of the samples.
(Biaxial Flexural Strength)

A disc-shaped sintered body having a thickness of 1 mm and a diameter of 25 mm (or 12 mm) was prepared, both surfaces of the sintered body were mirror-polished to a surface roughness (Ra) of 0.02 μm or less and the resultant was used as a measurement sample. The biaxial flexural strength of the measurement sample was measured in accordance with the biaxial flexural strength measurement specified in ISO/DIS6872. In the biaxial flexural strength measurement, three supports were arranged in accordance with the shape of the measurement sample, such that the diameter of the support circle was 22 mm or 11 mm so that the interface between the transparent zirconia portion and the opaque zirconia portion was located inside the support circle. The supports used were zirconia balls having a ball diameter of 9.5 mm. The measurement was performed by applying a load such that the load was applied to the transparent zirconia portion.
(EPMA Measurement)

By using an EPMA instrument (instrument name; EPMA-1610, manufactured by Shimadzu Corporation), a backscattered electron image was observed, and an elemental map was obtained, under the following conditions.

Measurement mode: wavelength-dispersive mode
Acceleration voltage: 15 kV
Probe current: 300 nA
Analysis area: 51.2 μm×51.2 μm
Number of fields of view: 3 fields of view By using analysis software (product name: EPMA system Ver. 2.14, manufactured by Shimadzu Corporation), which was provided with the EPMA-1610, the obtained elemental map was converted to a binary map, and the number of regions in the background where the characteristic X-ray intensity, for cobalt and iron separately, was 1.5 times or more was counted. Based on the ratio of the number of each of the regions to the number of the counted regions, a Co distribution, an Fe distribution, a highest Co abundance distribution and a highest Fe abundance distribution were determined.

As a sample of the sintered body, a disc-shaped sintered body having a thickness of 1 mm and a diameter of 16 mm, which was provided with a surface roughness Ra of 0.02 μm or less, was used.

Example 1

(Transparent Raw Material)

A zirconia powder containing 10 mol % yttria was mixed with a titania powder in an ethanol solvent by using a ball mill with zirconia balls having a diameter of 10 mm. The zirconia powder had a BET specific surface area of 5.3 m$^2$/g, and the titania powder had a BET specific surface area of 20 m$^2$/g. The mixing that used a ball mill was performed in a manner in which the titania powder was ground in an ethanol solvent, and then the zirconia powder containing yttria was mixed therewith. The mixed powder was dried in air to yield a zirconia powder containing 10 mol % yttria and 9.1 mol % titania. The zirconia powder was used as the transparent raw material. An amount of the titanium (Ti) in the titania present in the transparent raw material was 6.8 mass % relative to the mass of the transparent raw material. The amount was a mass ratio of the titanium calculated as TiO$_2$.

(Opaque Raw Material)

An alumina powder, an iron oxide powder, a cobalt oxide powder, a titania powder and a zirconia powder containing 3 mol % yttria were wet-mixed in an ethanol solvent by using a ball mill with zirconia balls. Accordingly, a mixed powder was obtained, which contained 0.25 mass % alumina, 0.16 mass % iron oxide and 0.04 mass % cobalt oxide, with the balance being zirconia containing 3 mol % yttria and 4.7 mol % titania. The mixed powder was dried in air at 110° C. and was subsequently sieved. The resultant was used as the opaque raw material (black raw material). An amount of the titanium (Ti) in the titania present in the opaque raw material was 3.0 mass % relative to the mass of the opaque raw material. The amount was a mass ratio of the titanium calculated as TiO$_2$ (hereinafter also referred to as a "mass ratio of the titanium".

(Green Body)

Figure 2:
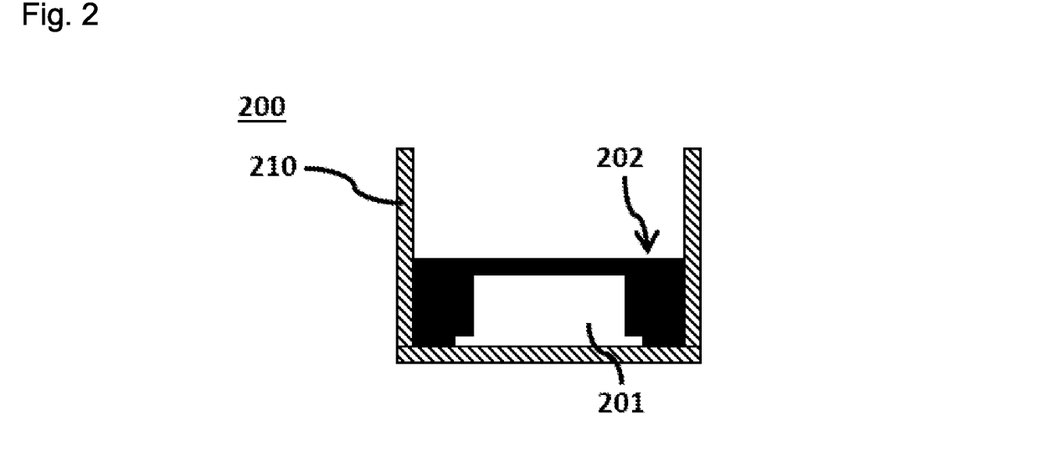
FIG. 2 presents a schematic diagram illustrating a cross section of a secondary green body.

The transparent raw material was loaded into a disc-shaped primary mold, which had a diameter of 25 mm and a protrusion-recess configuration. The transparent raw material was uniaxially pressed at a pressure of 25 MPa, and, accordingly, a primary green body formed of a disc-shaped transparent green body having a thickness of 2 mm and a diameter of 25 mm was obtained. The primary green body was placed in a disc-shaped secondary mold having a diameter of 50 mm, such that the protrusion configuration formed an upper surface of the primary green body. The opaque raw material was loaded to cover the entire upper surface of the primary green body. Subsequently, the resultant was uniaxially pressed at a pressure of 50 MPa to yield a secondary green body in which the transparent green body and the opaque green body were layered. Subsequently, the secondary green body was treated by CIP at a pressure of 200 MPa. Accordingly, a disc-shaped secondary green body having a thickness of 3.5 mm and a diameter of 50 mm was obtained. FIG. 2 presents a schematic diagram illustrating a cross section of the secondary green body (200). In FIG. 2, the secondary green body, in which the transparent green body and the opaque green body are layered, is within the secondary mold (210); in the structure of the secondary green body, the primary green body (201) formed of a transparent green body is disposed, and the exposed surface of the primary green body is covered with the opaque green body (202).

(Zirconia Sintered Body)

The obtained secondary green body was pressureless sintered in air at a heating rate of 100° C./h and a sintering temperature of 1350° C. for a sintering time of 2 hours. Subsequently, the resultant was treated by HIP at a temperature of 1500° C. and a pressure of 150 MPa for a holding time of 1 hour. After the HIP treatment, the resultant was annealed in air at 900° C. for 8 hours, and, accordingly a sintered body was obtained. In the HIP treatment, an argon gas with a purity of 99.9% was used as a pressure medium, and the sample was placed in a carbon container with a lid.

The annealed sintered body was machined and polished until the transparent zirconia portion and the opaque zirconia portion were exposed on both surfaces of the sintered body. Accordingly, a disc-shaped zirconia sintered body was obtained, which had a thickness of 1.0 mm and included a transparent zirconia portion and an opaque zirconia portion, with the transparent zirconia portion and the opaque zirconia portion being exposed in the same plane. This sintered body was used as a zirconia sintered body of the present example.

Figure 3:
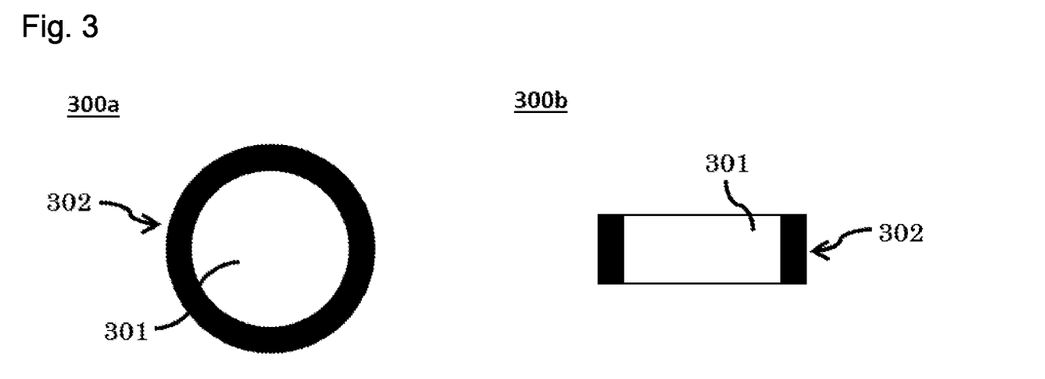
FIG. 3 presents schematic diagrams illustrating the appearance (in a front section and a cross section) of a zirconia sintered body of Example 1.

FIG. 3 presents schematic diagrams illustrating the appearance, in a front section (300a) and a cross section (300b), of the machined and polished zirconia sintered body of the present embodiment. As illustrated in the front view (300a), the zirconia sintered body of the present example has a structure in which the opaque zirconia portion (302) is disposed to surround the transparent zirconia portion (301), and the zirconia sintered body has a disc shape in which the transparent zirconia portion (301) and the opaque zirconia portion (302) are exposed in the same plane. Furthermore, as illustrated in the cross-sectional view (300b), the zirconia sintered body of the present example has a structure in which the transparent zirconia portion continuously extends in a thickness direction. Because of the transparency of the transparent zirconia portion, the zirconia sintered body of the present embodiment functions like a window material when the zirconia sintered body is disposed, and, therefore, a design or the like in the background can be visually perceived therethrough.

The annealed zirconia sintered body was subjected to a composition analysis that used EPMA. The EPMA composition analysis confirmed that, in the transparent zirconia portion of the zirconia sintered body, cobalt was not present (in an amount less than or equal to the detection limit) within a region of 10 μm of the interface.

Furthermore, regarding the difference in the linear shrinkage rate of the present example, it was confirmed that $\Delta S_{(1300)}$ was 0.8%, $\Delta S_{(1400)}$ was 3.0% and $\Delta S_{(1500)}$ was 0.6%; and $\Delta S_{(MAX)}$ was 3.0%, and the difference between $\Delta S_{(1300)}$ and $\Delta S_{(1500)}$ was 0.2%.

Examples 2 and 3

Zirconia sintered bodies of Examples were obtained in a manner similar to that of Example 1 except for the following differences. The mixing ratio between the alumina powder, the iron oxide powder, the cobalt oxide powder, the titania powder and the zirconia powder containing 3 mol % yttria (or a zirconia powder containing 4 mol % yttria) was changed such that the compositions shown below were achieved to obtain opaque raw materials (black raw materials); primary green bodies formed of a disc-shaped transparent green body having a thickness of 5 mm and a diameter of 12 mm were prepared by using a disc-shaped primary mold having a diameter of 12 mm and a protrusion-recess configuration; and disc-shaped secondary green bodies having a thickness of 4 mm and a diameter of 25 mm were obtained in a manner similar to that of Example 1, except that the primary green bodies just mentioned were used. Note that in both of the Examples, the mass ratio of the titanium was 3.0 mass %.

TABLE 1

|  | Al$_2$O$_3$ (wt %) | Fe$_2$O$_3$ (wt %) | Co$_3$O$_4$ (wt %) | Balance | | |
|---|---|---|---|---|---|---|
|  |  |  |  | Y$_2$O$_3$ (mol %) | TiO$_2$ (mol %) | ZrO$_2$ (mol %) |
| Example 2 | 0.25 | 0.200 | 0.100 | 4.0 | 4.73 | 91.27 |
| Example 3 | 0.25 | 0.333 | 0.167 | 4.0 | 4.74 | 91.26 |

Examples 4 to 11

(Transparent Raw Material and Opaque Raw Material)

A zirconia powder containing 10 mol % yttria and 9.1 mol % titania, which was obtained in a manner similar to that of Example 1, was used as the transparent raw material.

Furthermore, mixed powders were obtained in a manner similar to that of Example 1 except that the mixing ratio between the alumina powder, the iron oxide powder, the cobalt oxide powder, the titania powder and the zirconia powder containing 3 mol % yttria was changed such that the compositions shown below were achieved. The mixed powders were used as the opaque raw material (black raw material). The compositions of the obtained opaque raw materials are shown in the table below. The mass ratio of the titanium was 4.0 mass % for Examples 4 to 8 and 5.0 mass % for Examples 9 to 11.

TABLE 2

|  | Al$_2$O$_3$ (wt %) | Fe$_2$O$_3$ (wt %) | Co$_3$O$_4$ (wt %) | Balance | | |
|---|---|---|---|---|---|---|
|  |  |  |  | Y$_2$O$_3$ (mol %) | TiO$_2$ (mol %) | ZrO$_2$ (mol %) |
| Example 4 | 0.25 | 0.267 | 0.133 | 4.0 | 6.28 | 89.72 |
| Example 5 | 0.50 | 0.267 | 0.133 | 4.0 | 6.29 | 89.71 |
| Example 6 | 1.00 | 0.267 | 0.133 | 4.0 | 6.32 | 89.68 |
| Example 7 | 2.00 | 0.267 | 0.133 | 4.0 | 6.38 | 89.62 |
| Example 8 | 4.00 | 0.267 | 0.133 | 4.0 | 6.52 | 89.48 |
| Example 9 | 0.25 | 0.200 | 0.100 | 4.0 | 7.79 | 88.21 |
| Example 10 | 0.25 | 0.266 | 0.134 | 4.0 | 7.80 | 88.20 |
| Example 11 | 0.25 | 0.333 | 0.167 | 4.0 | 7.81 | 88.19 |

(Sintered Body)

Disc-shaped secondary green bodies having a thickness of 4 mm and a diameter of 23 mm were obtained in a manner similar to that of Example 1, except for the following differences. The respective opaque raw materials were used; primary green bodies formed of a disc-shaped transparent green body having a thickness of 5 mm and a diameter of 12 mm were prepared by using a disc-shaped primary mold having a diameter of 12 mm and a protrusion-recess configuration; and the primary green bodies just mentioned were used. Zirconia sintered bodies of the Examples were obtained from the obtained secondary green bodies in a manner similar to that of Example 1.

All of the obtained zirconia sintered bodies were disc-shaped zirconia sintered bodies that had a thickness of 1.0 mm and included a transparent zirconia portion and an opaque zirconia portion, with the transparent zirconia portion and the opaque zirconia portion being exposed in the same plane. The color of the opaque zirconia portions of Examples 4, 6, and 7 were measured, and the results were as follows: the lightness L* was 0.74, the hue a* was 0.05 and the hue b* was −0.20 (Example 4); the lightness L* was 2.64, the hue a* was 0.65 and the hue b* was 0.78 (Example 6); and the lightness L* was 6.75, the hue a* was 1.33 and the hue b* was 2.66 (Example 7).

Examples 12 to 15

Zirconia sintered bodies of the Examples were obtained in a manner similar to that of Example 2 except that the opaque raw materials (black materials) were obtained with the mixing ratio between the iron oxide powder, the cobalt oxide powder, the titania powder and the zirconia powder containing 3 mol % yttria being changed such that the compositions shown below were achieved. Note that in all of the Examples, the mass ratio of the titanium was 3.0 mass %.

TABLE 3

|  | Fe$_2$O$_3$ (wt %) | Co$_3$O$_4$ (wt %) | Balance | | |
|---|---|---|---|---|---|
|  |  |  | Y$_2$O$_3$ (mol %) | TiO$_2$ (mol %) | ZrO$_2$ (mol %) |
| Example 12 | 0.040 | 0.160 | 3.0 | 4.69 | 92.31 |
| Example 13 | 0.070 | 0.130 | 3.0 | 4.69 | 92.31 |
| Example 14 | 0.130 | 0.070 | 3.0 | 4.72 | 92.28 |
| Example 15 | 0.160 | 0.040 | 3.0 | 4.69 | 92.31 |

Examples 16 to 23

Zirconia sintered bodies of the Examples were obtained in a manner similar to that of Example 2 except that the opaque raw materials (black materials) were obtained with the mixing ratio between the alumina powder, the iron oxide powder, the cobalt oxide powder, the titania powder, a trimanganese tetraoxide powder and the zirconia powder containing 3 mol % yttria (or a zirconia powder containing 4 mol % yttria) being changed such that the compositions shown below were achieved. Note that the mass ratio of the titanium was 3.0 mass % for Example 16 and 4.0 mass % for Examples 17 to 23.

TABLE 4

|  | Al$_2$O$_3$ (wt %) | Fe$_2$O$_3$ (wt %) | Co$_3$O$_4$ (wt %) | Mn$_3$O$_4$ (wt %) | Balance | | |
|---|---|---|---|---|---|---|---|
|  |  |  |  |  | Y$_2$O$_3$ (mol %) | TiO$_2$ (mol %) | ZrO$_2$ (mol %) |
| Example 16 | 0 | 0.133 | 0.067 | 0.050 | 3.0 | 4.69 | 92.31 |
| Example 17 | 0.25 | 0.133 | 0.067 | 0.050 | 4.0 | 4.73 | 91.27 |
| Example 18 | 0.25 | 0.133 | 0.067 | 0.100 | 4.0 | 4.73 | 91.27 |
| Example 19 | 0.25 | 0.133 | 0.067 | 0.150 | 4.0 | 4.73 | 91.27 |
| Example 20 | 1.00 | 0.266 | 0.133 | 0.050 | 4.0 | 6.33 | 89.67 |
| Example 21 | 4.00 | 0.266 | 0.133 | 0.100 | 4.0 | 6.53 | 89.48 |
| Example 22 | 1.00 | 0.266 | 0.133 | 0.200 | 4.0 | 6.34 | 89.66 |
| Example 23 | 2.00 | 0.266 | 0.133 | 0.300 | 4.0 | 6.41 | 89.59 |

Furthermore, the difference in the linear shrinkage rate of Examples 17 to 19 was measured, and the differences in the linear shrinkage rate were as follows: for Example 17, $\Delta S_{(1300)}$ was 4.1%, $\Delta S_{(1400)}$ was 5.2% and $\Delta S_{(1500)}$ was 1.9%; for Example 18, $\Delta S_{(1300)}$ was 4.9%, $\Delta S_{(1400)}$ was 4.8% and $\Delta S_{(1500)}$ was 1.9%; and for Example 19, $\Delta S_{(1300)}$ was 5.9%, $\Delta S_{(1400)}$ was 5.0% and $\Delta S_{(1500)}$ was 1.9%.

Comparative Example 1

A ceramic joined body was obtained in accordance with Japanese Unexamined Patent Application Publication No. 2013-14471, as described below.
(Black Zirconia Sintered Body)
A black zirconia powder (product name: TZ-Black, manufactured by Tosoh Corporation) was uniaxially pressed at a pressure of 50 MPa, and subsequently, the resultant was treated by CIP at a pressure of 200 MPa. Accordingly, a plate-shaped green body having a length of 30 mm and a width of 40 mm was obtained. The obtained green body was pressureless sintered, and subsequently, the obtained zirconia sintered body was machined. Accordingly, a frame-shaped black zirconia sintered body was obtained, which had a thickness of 1.15 mm, a length of 28 mm and a width of 36 mm and included a rectangular hollow portion having a thickness of 1.15 mm, a length of 14 mm and a width of 22 mm included therein.
(Transparent Zirconia Sintered Body)
A high-purity titania powder was added to a zirconia powder containing 10 mol % yttria (product name: TZ-10YS, manufactured by Tosoh Corporation). An amount of the added titania powder was 10 mol % relative to an amount of zirconia. The powders were mixed together in an ethanol solvent for 72 hours by using a ball mill with zirconia balls having a diameter of 10 mm. Subsequently, the resultant was dried to give a raw material powder. The raw material powder was uniaxially pressed at a pressure of 50 MPa, and subsequently, the resultant was treated by CIP at a pressure of 200 MPa. Accordingly, a plate-shaped green body having a thickness of 2 mm, a length of 50 mm and a width of 40 mm was obtained.
The obtained plate-shaped green body was pressureless sintered in air at a heating rate of 100° C./h and a sintering temperature of 1350° C. for a sintering time of 2 hours. Accordingly, a pressureless-sintered body was obtained. Next, the pressureless-sintered body was treated by HIP at a temperature of 1650° C. and a pressure of 150 MPa for a holding time of 1 hour. In the HIP treatment, an argon gas with a purity of 99.9% was used as a pressure medium, and the sample was placed in a carbon container with a lid. After the HIP sintering, the resultant was annealed in air at 1000° C. for 1 hour, and, accordingly, a transparent zirconia sintered body was obtained.
(Ceramic Joined Body)
The transparent zirconia sintered body was placed inside the black zirconia sintered body, and the resultant was treated by HIP at a pressure of 150 MPa and a holding temperature of 1200° C. for a holding time of 1 hour. Accordingly, a ceramic joined body was obtained. The HIP treatment was performed at a holding temperature of 1200° C. and a pressure of 150 MPa for a holding time of 1 hour; an argon (Ar) gas with a purity of 99.9% was used as a pressure medium, and the sample was placed in an alumina container. After the HIP treatment, the obtained HIP-sintered body was annealed in air at 1000° C. for 1 hour, and, accordingly, a zirconia joined body of the present comparative example was obtained.

The results of measurement of the biaxial flexural strength of the Examples and Comparative Example are shown in the table below.

TABLE 5

| | Biaxial flexural strength [MPa] |
|---|---|
| Example 1 | 409 |
| Example 2 | 375 |
| Example 3 | 652 |
| Example 4 | 703 |
| Example 5 | 434 |
| Example 6 | 610 |
| Example 7 | 625 |
| Example 8 | 438 |
| Example 9 | 757 |
| Example 10 | 476 |
| Example 11 | 566 |
| Example 12 | 404 |
| Example 13 | 450 |
| Example 14 | 476 |
| Example 15 | 373 |
| Example 16 | 509 |
| Example 17 | 630 |
| Example 18 | 781 |
| Example 19 | 511 |
| Example 20 | 491 |
| Example 21 | 494 |
| Example 22 | 910 |
| Example 23 | 471 |
| Comparative Example 1 | 239 |

All of the zirconia sintered bodies of the Examples had a biaxial flexural strength of 350 MPa or greater, a biaxial flexural strength of greater than 400 MPa or a biaxial flexural strength of 600 MPa or greater, whereas the zirconia joined body of Comparative Example 1 had a biaxial flexural strength of less than 250 MPa. Furthermore, a source of fracture in the zirconia joined body of Comparative Example 1 was examined, and it was found that the fracture was initiated at a portion (junction surface) at which the black zirconia sintered body and the translucent zirconia sintered body were in contact with each other.

Synthesis Example 1 (Transparent Zirconia Sintered Body)

A primary green body was obtained in a manner similar to that of Example 1. A transparent zirconia sintered body was prepared in a manner similar to that of Example 1 except that the obtained primary green body was used instead of a secondary green body.
The obtained zirconia sintered body had transparency similar to that of the transparent zirconia portion of the zirconia sintered body of Example 1. The obtained zirconia sintered body had an in-line transmittance of 69% and an average grain size of 25 μm.
The biaxial flexural strength of the transparent zirconia sintered body was 181 MPa, which was a value lower than that of the biaxial flexural strength of the zirconia sintered bodies of the Examples.

Synthesis Example 2 (Black Zirconia Sintered Body)

A primary green body was obtained in a manner similar to that of Example 1 except that a raw material powder for the opaque zirconia portion was used instead of a raw material powder for the transparent zirconia portion. A black zirconia sintered body was prepared in a manner similar to that of Example 1 except that the obtained primary green body was used instead of a secondary green body.

The obtained zirconia sintered body had a color similar to that of the opaque zirconia portion of the zirconia sintered body of Example 1. The obtained zirconia sintered body had an in-line transmittance of 0% (less than or equal to the detection limit), an average grain size of 1.1 μm and a monoclinic phase fraction of 0%.

Examples 24 to 26

Zirconia sintered bodies of the Examples were obtained in a manner similar to that of Example 2 except that the opaque raw materials (black materials) were obtained with the mixing ratio between the alumina powder, the iron oxide powder, the cobalt oxide powder, the titania powder, a silica powder and the zirconia powder containing 4 mol % yttria being changed such that the compositions shown below were achieved. Note that in all of the Examples, the mass ratio of the titanium was 4.0 mass %.

TABLE 6

|  | $Al_2O_3$ (wt %) | $Fe_2O_3$ (wt %) | $Co_3O_4$ (wt %) | $SiO_2$ (wt %) | Balance | | |
|---|---|---|---|---|---|---|---|
|  |  |  |  |  | $Y_2O_3$ (mol %) | $TiO_2$ (mol %) | $ZrO_2$ (mol %) |
| Example 24 | 0.25 | 0.266 | 0.133 | 0.500 | 4.0 | 6.31 | 89.69 |
| Example 25 | 0.25 | 0.266 | 0.133 | 2.000 | 4.0 | 6.40 | 89.60 |
| Example 26 | 0.25 | 0.266 | 0.133 | 4.000 | 4.0 | 6.53 | 89.47 |

Example 27

(Transparent Raw Material)

A zirconia powder containing 10 mol % yttria and 9.1 mol % titania was obtained in a manner similar to that of Example 1. An amount of the titanium (Ti) in the titania present in the mixed powder was 6.8 mass % relative to the mass of the mixed powder. The amount was a mass ratio of the titanium calculated as $TiO_2$. A composition was formed by mixing the powder with an organic binder containing an acrylic resin, and the composition was used as a transparent raw material of the present example.

(Opaque Raw Material)

In a manner similar to that of Example 1, a mixed powder was obtained, which contained 0.25 mass % alumina, 0.16 mass % iron oxide and 0.04 mass % cobalt oxide, with the balance being zirconia containing 3 mol % yttria and 4.7 mol % titania. An amount of the titanium (Ti) in the titania present in the mixed powder was 3.0 mass % relative to the mass of the mixed powder. The amount was a mass ratio of the titanium calculated as $TiO_2$. A composition was formed by mixing the mixed powder with an organic binder containing an acrylic resin, and the composition was used as an opaque raw material of the present example.

(Green Body)

The transparent raw material was injection-molded in a primary mold, and, accordingly, a primary green body formed of a disc-shaped transparent green body having a protrusion-recess configuration, a thickness of 2 mm and a diameter of 25 mm was obtained. The obtained primary green body was placed in a disc-shaped secondary mold having a diameter of 50 mm such that the protrusion-recess configuration formed the upper surface of the primary green body. The opaque raw material was injection-molded onto the primary green body such that the entire upper surface (exposed surface) of the primary green body was covered. Accordingly, a secondary green body in which the transparent green body and the opaque green body were layered was obtained. The secondary green body had a disc shape with a thickness of 3.5 mm and a diameter of 50 mm.

(Zirconia Sintered Body)

Pressureless sintering, a HIP treatment, annealing and processing were performed in a manner similar to that of Example 1 except that the obtained secondary green body was used. Accordingly, a zirconia sintered body of the present example was obtained.

The zirconia sintered body of the present example was a disc-shaped sintered body that had a thickness of 1 mm and in which the transparent zirconia portion and the opaque zirconia portion were exposed in the same plane.

The entire contents of the specification, claims, drawings and abstracts of Japanese Patent Application No. 2019-058458 filed on Mar. 26, 2019 and Japanese Patent Application No. 2020-025331 filed on Feb. 18, 2020 are cited herein and incorporated as disclosures of the specification of the present disclosure.

REFERENCE SIGNS LIST

100a, 100b, 200a, 200b: zirconia sintered body
101, 301: transparent zirconia portion
102, 302: opaque zirconia portion
110a, 110b, 110c: support
120: load
200: secondary green body
201: primary green body (transparent green body)
202: opaque green body
210: secondary mold

The invention claimed is:

1. A zirconia sintered body comprising:
   a transparent zirconia portion; and
   an opaque zirconia portion, wherein
   the transparent zirconia portion and the opaque zirconia portion include zirconia with the zirconia containing a stabilizing agent and titania,
   a content of titania in the opaque zirconia portion is 1 mol % or greater and 7.81 mol % or less, and
   the zirconia sintered body has a biaxial flexural strength of greater than or equal to 300 MPa.

2. The zirconia sintered body according to claim 1, wherein the transparent zirconia portion and the opaque zirconia portion are disposed in a same plane.

3. The zirconia sintered body according to claim 1, wherein the transparent zirconia portion has an in-line transmittance of greater than or equal to 50%.

4. The zirconia sintered body according to claim 1, wherein the opaque zirconia portion has an in-line transmittance of less than 5%.

5. The zirconia sintered body according to claim 1, wherein the stabilizing agent is at least one selected from the group consisting of yttria, calcia and magnesia.

6. The zirconia sintered body according to claim 1, wherein, in the transparent zirconia portion, the stabilizing agent is yttria, and a content of the yttria is 6 mol % or greater and 12 mol % or less.

7. The zirconia sintered body according to claim 1, wherein, in the opaque zirconia portion, the stabilizing agent is yttria, and a content of the yttria is 2 mol % or greater and less than 6 mol %.

8. The zirconia sintered body according to claim 1, wherein a content of the titania in the opaque zirconia portion is less than a content of the titania in the transparent zirconia portion.

9. The zirconia sintered body according to claim 1, wherein the opaque zirconia portion includes a coloring element.

10. The zirconia sintered body according to claim 9, wherein the coloring element is at least one selected from the group consisting of transition metal elements, alkali metal elements, alkaline earth metal elements, aluminum, silicon, boron, phosphorus, germanium and rare earth metals.

11. The zirconia sintered body according to claim 1, wherein the zirconia sintered body has a biaxial flexural strength of greater than or equal to 350 MPa.

12. A method for producing the zirconia sintered body according to claim 1, the method comprising sintering a secondary green body in which a primary green body and a different green body are layered, the primary green body being made from one of a raw material powder for the transparent zirconia portion or a raw material powder for the opaque zirconia portion, the different green body being made from a different one of the raw material powder for the transparent zirconia portion or the raw material powder for the opaque zirconia portion.

13. The method for producing the zirconia sintered body according to claim 12, wherein the raw material powder for the transparent zirconia portion and the raw material powder for the opaque zirconia portion are each a mixed powder that includes a stabilizing-agent-containing zirconia source and a titania source.

14. The method for producing the zirconia sintered body according to claim 12, wherein the sintering includes at least a HIP treatment.

15. The method for production according to claim 12, wherein the sintering includes performing pressureless sintering at a temperature of 1300° C. or greater and 1400° C. or less and subsequently performing a HIP treatment at a temperature of 1450° C. or greater and 1550° C. or less.

* * * * *